United States Patent Office 3,043,760
Patented July 10, 1962

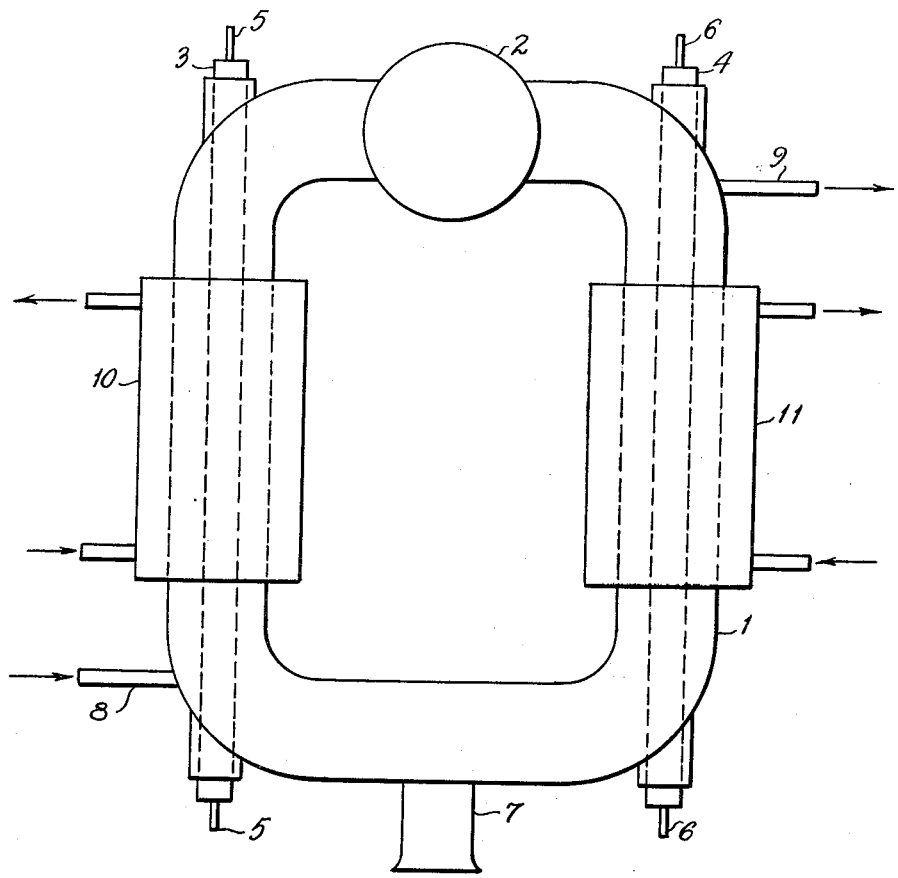

3,043,760
METHOD FOR PRODUCING BODIES OF PREFERABLY NON-LINEAR POLYATOMIC SYNTHETICS
Gerlinde Bürklin and Erich Kasten, Erlangen, Germany, assignors to Siemens-Schuckertwerke Aktiengesellschaft, Berlin-Siemensstadt and Erlangen, Germany, a corporation of Germany
Filed Mar. 12, 1958, Ser. No. 721,017
Claims priority, application Germany Mar. 27, 1957
16 Claims. (Cl. 204—162)

Our invention relates to a method of producing shaped bodies from polyatomic materials, generally synthetic, and has for its object to economically improve the production of such bodies as well as their properties. More specific objects of our invention are to improve the moldability of such materials and to avoid memory effects in the shaped bodies pressed, extruded or injection-molded from materials of this type.

It is known that the physical and chemical properties of certain synthetics, namely those having a polyatomic non-linear molecule structure, can be modified considerably by subjecting the material to high-energy wave or corpuscular irradiation which augments the degree of cross-linking. According to the methods and proposals heretofore known, such synthetic material is irradiated in raw condition, for instance in form of a foil, sheet or other profiled semi-finished product, or after completed fabrication of the shaped bodies to be produced. To obtain interlinking down to relatively large depths, correspondingly great amounts of radiating energy or long irradiation periods must be used. As a result, in certain cases, technologically or economically undesired long radiation periods are necessary and, where relatively large layer thicknesses are involved, certain types of irradiation are not suitable at all.

It is, therefore, a specific object of our invention, relating to synthetic materials interlinkable by means of radiation, to provide a processing method which affords the desired results with the aid of relatively small amounts of radiating energy and/or relatively short radiation periods.

According to our invention, we attain the above-mentioned objects by first pulverizing the polyatomic synthetic starting material and then passing the powder, within a current of preferably inert gas, through the action range of the radiation source during a period of time sufficient to produce the desired degree of interlinking. The synthetic powder, thus processed and augmented as to the degree of polyatomic non-linear cross-linking, is thereafter fabricated in the usual manner for producing the shaped body.

A particular advantage of the method according to the invention is the fact that it affords an interlinking of suitable synthetic materials practically to any desired degree by irradiation, and that the powder thus treated can be molded by the usual shaping methods into synthetic bodies which are interlinked throughout to a predetermined degree. Preferably used for this purpose is ultraviolet radiation, for example the radiation from a mercury high-pressure discharge tube or a mercury low-pressure discharge tube. In view of the relatively easy production and handling of ultraviolet radiation, the use of this particular type source is especially favorable.

The invention utilizes our experimental experience that powdered synthetics interlinked by radiation are generally moldable into shaped bodies by the usual methods such as pressing, injection-molding, or extrusion.

As mentioned above, the method is particularly important because of the applicability of ultraviolet radiation. Such radiation permits obtaining a considerable degree of interlinking in the synthetic materials during a radiation period in the order of hours rather than days or weeks. For example, the radiation of a commercially available polyethylene powder in a nitrogen current by means of a mercury low-pressure lamp resulted within approximately fifteen hours in such a high degree of polyatomic interlinking that 80 to 90% insolubility of the powder in organic solvents was obtained. The powder thus processed could readily be pressed into the shape of plates. It was further found as particularly notable that the plates did not exhibit any memory effect.

The method is preferably carried out in a circulatory system. The radiation period can be reduced by locating the number of radiation sources behind one another in the circulatory system. The effectiveness of the radiation can further be increased by maintaining the powder within the gas current at elevated temperature. The temperature, however, must not be so high as to cause sticking of the powder particles in the equipment. For example, when processing polyethylene in the above-described manner, a temperature of 60 to 70° C. is recommended.

The method is particularly suitable for the production of interlinked bodies from synthetic or natural materials whose molecular chain- and branched-off members are formed of carbon and hydrogen as is the case with polyethylene, polypropylene, natural rubber, synthetic rubber, or poly-p-xylene. Suitable as synthetic starting material are also polyatomic non-linear substances whose chain members and branched-off members, aside from carbon and hydrogen, contain other atoms, for example nitrogen, oxygen or sulfur, as is the case with polyvinyl alcohol and polyacrylonitrile.

An apparatus for performing the method is illustrated in the accompanying drawing, which is a diagrammatic view illustrating a circulatory system.

Denoted by 1 is an annular tubular body in which the powder is kept in circulation by means of an impeller drive 2. The body 1 is sealed or closed during operation. Employed as radiation source are two gaseous discharge tubes shown at 3 and 4. The electrode connections to the tubes are at 5 and 6. The powder material is supplied and discharged through a conduit 7. The inert gas is supplied and discharged at 8 and 9. To adjust and maintain the desired temperature conditions, the circulatory system is surrounded by two heating jackets 10 and 11. The jackets may be traversed, for instance, by a liquid of the proper temperature. The supply and discharge of the liquid at the corresponding conduits of the jackets is indicated by arrows. The temperature adjustment may also be effected by electrical heating, for example with the aid of an electric heating resistor (not shown), which surrounds the circulatory system.

A suitable radiation source in the above examples is a mercury low-pressure discharge lamp having a radiation maximum at 254 m$\mu$, an operating voltage of 450 volts, and an energy output of 18.5 watts. Suitable as inert gas is, for example, oxygen-free nitrogen at atmospheric pressure, or under slight over-pressure of approximately 1 cm. Hg.

A more detailed example follows: 600 g. polyethylene powder of commercially available type having a predominant particle diameter of 0.1 $\mu$ (micron) is circulated, in suspension in oxygen-free nitrogen, in the described equipment for about ten hours, at an average temperature in the processing space of approximately 60° to 70° C. The apparatus, instead of the individual gas discharge lamp shown on the drawing, in practice comprises six individual lamps in a row, in place of each of the lamps 3 and 4. The polyethylene powder used in the process is completely soluble at 80° C. in an organic solvent, for example xylol, prior to the radiation process. After the process just described is completed, the solubility declines down to 12%.

It is understood that the powder so treated is thereafter pressed, formed, molded or extruded into shaped bodies by any one of the procedures commonly known in the art. In compression molding the mold is heated, by steam, and a measured charge of the thermoplastic molding compound, for example, in powder form, is introduced, and the mold is closed. In injection-molding, a plunger forces the material, cold and in granular form for example, into a heated chamber.

We claim:
1. A process of making a polyethylene molding powder comprising re-circulating a suspension of polyethylene powder in oxygen-free nitrogen while irradiating the suspension with ultraviolet radiation, the suspension being at about 60° to 90° C., whereby the solubility of the polyethylene in xylol is decreased, said radiation being that of a mercury low-pressure discharge tube having a radiation maximum at about 254 mµ and an energy output of about 18.5 watts, the said irradiating being for at least several hours.

2. In a method for producing a shaped body from a polymeric organic material cross-linkable by irradiation, the improvement comprising pulverizing the material and passing it in suspension within an inert gas current through the active range of a source of ultraviolet radiation during a period of time sufficient for augmenting cross-linking, and fabricating the powder product to form a shaped body.

3. In a method for producing a shaped body from a polymeric organic material cross-linkable by irradiation, said material being a polymeric olefinic hydrocarbon, the improvement comprising pulverizing the material and passing it in suspension within an inert gas current through the active range of a source of ultraviolet radiation during a period of time sufficient for augmenting cross-linking, and fabricating the powder product to form a shaped body.

4. In a method for producing a shaped body from a polymeric organic material cross-linkable by irradiation, the improvement comprising pulverizing the material and passing it in suspension within an inert gas current through the active range of a source of ultraviolet radiation during a period of time sufficient for augmenting cross-linking and being a number of hours, and fabricating the powder product to form a shaped body, said body being one whose chain members and branched-off members consist of carbon and hydrogen.

5. In a method for producing a shaped body from a polymeric organic material cross-linkable by irradiation, the improvement comprising pulverizing the material and passing it in suspension within an inert gas current through the active range of a source of ultraviolet radiation during a period of time sufficient for augmenting cross-linking, and fabricating the powder product to form a shaped body, said body being one whose chain members and branched-off members consist of carbon, hydrogen and at least one element of the group consisting of nitrogen, oxygen and sulfur.

6. In a method for producing a shaped body from a polymeric organic material cross-linkable by irradiation, the improvement comprising pulverizing the material and passing it in suspension within an inert gas current through the active range of a source of ultraviolet radiation, the powder suspension being repeatedly cycled through said range for a sufficient time to produce a cross-linking, and fabricating the powder product to form a shaped body.

7. In a method for producing a shaped body from a polymeric hydrocarbon material cross-linkable by irradiation, the improvement comprising pulverizing the material and passing it in suspension within an inert gas current through the active range of a source of ultraviolet radiation having an energy output in the order of 18.5 watts during a period of time sufficient for augmenting cross-linking, being a number of hours, the powder being repeatedly cycled in a path along which several ultraviolet radiation sources are sequentially placed, and fabricating the powder product to form a shaped body.

8. In a method for producing a shaped body from polymeric organic materials cross-linkable by irradiation, comprising pulverizing the material and passing it in suspension within an inert gas current through the active range of radiation from a mercury discharge tube to augment cross-linking, and fabricating the powder product to form a shaped body.

9. A process of making a partially reacted polyethylene molding powder comprising suspending polyethylene powder in an inert gas and irradiating the suspension with ultraviolet radiation to increase the cross-linkages in the particles, said irradiation continuing for at least several hours.

10. A process of making a polyethylene molding powder comprising circulating a suspension of polyethylene powder in oxygen-free nitrogen while irradiating the suspension with ultraviolet radiation.

11. A process of making a polyethylene molding powder comprising re-circulating a suspension of polyethylene powder in oxygen-free nitrogen while irradiating the suspension with ultraviolet radiation, the suspension being at about 60 to 90° C., whereby the solubility of the polyethylene in xylol is decreased.

12. A process of making a polymeric molding powder comprising suspending a powder of polymerizable hydrocarbon material, having an olefine bond, in an inert gas and irradiating the suspension with ultraviolet radiation to increase the cross-linkages in the respective particles.

13. The process of claim 2 in which the material is rubber.

14. The process of claim 2 in which the material is poly-p-xylylene.

15. The process of claim 2 in which the material is polyvinyl alcohol.

16. The process of claim 2 in which the material is polyacrylonitrile.

References Cited in the file of this patent

UNITED STATES PATENTS

| | | |
|---|---|---|
| 2,050,595 | Wolfe | Aug. 11, 1936 |
| 2,145,639 | Zander | Jan. 31, 1939 |
| 2,429,217 | Brasch | Oct. 21, 1947 |
| 2,836,553 | Guthrie et al. | May 27, 1958 |
| 2,855,517 | Rainer et al. | Oct. 7, 1958 |
| 2,919,473 | Cole | Jan. 5, 1960 |

FOREIGN PATENTS

| | | |
|---|---|---|
| 204,798 | Australia | Dec. 4, 1956 |
| 624,409 | Great Britain | June 8, 1949 |
| 732,047 | Great Britain | June 15, 1955 |

OTHER REFERENCES

Sun, "Modern Plastics," vol. 32 No. 1, pages 141–144, 146, 148, 150, 229–233, 236–238. Sept. 1954.

Doede et al.: "Chemical Engineering," vol. 62, pages 163–171, Feb. 1955.